United States Patent
Lau

(10) Patent No.: US 7,600,981 B2
(45) Date of Patent: Oct. 13, 2009

(54) METHOD FOR OPTIMIZING THE OPERATION OF A PLURALITY OF COMPRESSOR ASSEMBLIES OF A NATURAL-GAS COMPRESSION STATION

(76) Inventor: Dieter Lau, Leipziger Str. 13, 45472 Muelheim (DE)

( * ) Notice: Subject to any disclaimer, the term of this patent is extended or adjusted under 35 U.S.C. 154(b) by 634 days.

(21) Appl. No.: 10/825,329

(22) Filed: Apr. 16, 2004

(65) Prior Publication Data

US 2004/0265133 A1 Dec. 30, 2004

Related U.S. Application Data

(63) Continuation of application No. PCT/DE02/03855, filed on Oct. 11, 2002.

(30) Foreign Application Priority Data

Oct. 16, 2001 (DE) .............................. 101 51 032

(51) Int. Cl.
*F04B 41/06* (2006.01)
*F04B 23/04* (2006.01)

(52) U.S. Cl. .................. 417/5; 417/2; 417/3; 417/4; 417/53; 417/426

(58) Field of Classification Search ................ 417/1–7, 417/53, 426

See application file for complete search history.

(56) References Cited

U.S. PATENT DOCUMENTS

| 4,142,838 | A | * | 3/1979 | Staroselsky | .................. | 417/20 |
| 4,330,237 | A | * | 5/1982 | Battah | ............................ | 417/2 |
| 4,486,148 | A | * | 12/1984 | Battah | ............................ | 417/2 |
| 4,807,150 | A | * | 2/1989 | Hobbs | ........................ | 702/47 |
| 4,831,535 | A | * | 5/1989 | Blotenberg | .................. | 701/100 |
| 5,108,263 | A | | 4/1992 | Blotenberg | | |

(Continued)

FOREIGN PATENT DOCUMENTS

EP 0 576 238 A1 12/1993

(Continued)

OTHER PUBLICATIONS

Naum Staroselsky, "Improved Surge Control for Centrifugal Compressors", Chemical Engineering, McGraw-Hill, New York, May 1, 1979, pp. 175-184.

(Continued)

Primary Examiner—Charles G Freay

(57) ABSTRACT

A method for optimizing the operation of several compressor units in a natural gas compression station. After a second or further compressor unit is started, the speeds of the running compressor units are set according to a fixed speed ratio in relation to characteristic data established for each compressor unit. The fixed speed ratio is altered by adjusting the rate of flow to the same percentage via the speed of rotation until the preventive pump valves of the gas compressor station are closed, whereupon the operating points of the compressor units are guided, where possible, in the characteristic data thereof, to the maximum efficiency. The optimum set speed values are determined according to continuous operating characteristics of the gas compression station by coordinated variation of the set speeds of the compressors, taking into account fuel consumption of the gas compression station. The stored fixed speed ratio is adjusted according to the optimum set speed values thus determined and stored.

6 Claims, 4 Drawing Sheets

U.S. PATENT DOCUMENTS

| | | | |
|---|---|---|---|
| 5,347,467 A | | 9/1994 | Staroselsky et al. |
| 5,743,714 A | * | 4/1998 | Drob .............................. 417/2 |
| 5,743,715 A | * | 4/1998 | Staroselsky et al. ............ 417/6 |
| 6,406,268 B1 | * | 6/2002 | Paice ........................... 417/53 |
| 6,499,504 B2 | * | 12/2002 | Wichert ................. 137/565.13 |
| 6,602,057 B2 | * | 8/2003 | Saxena et al. ............... 417/286 |

FOREIGN PATENT DOCUMENTS

EP            0 769 624 A1     4/1997

OTHER PUBLICATIONS

Dieter Lau, "Kennfeldoptimierung fuer Erdgasverdichtereinheiten im Parallelbetrieb" ["Characteristics Optimization for Natural Gas Compressor Units in Parallel Operation"], 1993, Siemens AG, gwf-Gas/Erdgas, Federal Republic of Germany, vol. 134, Issue 5, pp. 256-257.

Dresser-Rand, "Surge Control", 1999; http://www.dresser-rand.com/controls/sc0498.htm.

Coleman, Keith Lamar, Aeromechanical Control of High-Speed Axial Compressor Stall, An Undergraduate Honor Thesis, The Ohio State University, 2006; https://kb.osu.edu/dspace/bitstream/1811/24050/1/Undergraduate_Honors_Thesis_2002.pdf.

* cited by examiner

○ operating points after optimization

□ operating points, compressor assemblies running at the same rotational speed

METHOD FOR OPTIMIZING THE OPERATION OF A PLURALITY OF COMPRESSOR ASSEMBLIES OF A NATURAL-GAS COMPRESSION STATION

This is a Continuation of International Application PCT/DE02/03855, with an international filing date of Oct. 11, 2002, which was published under PCT Article 21(2) in German, and the disclosure of which is incorporated into this application by reference.

FIELD OF AND BACKGROUND OF THE INVENTION

The invention relates to a method for optimizing the operation of a plurality of compressor assemblies of a natural-gas compression station.

Natural-gas compression stations are controlled or regulated by means of what may be referred to as station automation, the task of which is to implement as actual values the desired values, predetermined by a central dispatching unit, for specific characteristic values of the natural-gas compression station. The station throughflow, which is the throughflow quantity through the natural-gas compression station, the suction pressure on the inlet side of the natural-gas compression station, the final pressure on the outlet side of the natural-gas compression station or the final temperature on the outlet side of the natural-gas compression station, for instance, may function as desired values (setpoint values) of this kind.

The compressor assemblies of such natural-gas compression stations often differ from one another both in the very differently designed drive machines and in different rotors, by means of which the gas transport through the natural-gas compression station is carried out.

Published documents in this field of endeavor include U.S. Pat. No. 5,347,467, U.S. Pat. No. 5,108,263, European Patent Application 0 576 238, and European Patent Application 0 769 624. Each of these documents is incorporated into the present application by reference.

OBJECTS OF THE INVENTION

One object of the present invention is to provide a method for improving or optimizing the operation of a plurality of compressor assemblies of a natural-gas compression station. It is a further object to automate the interaction of a plurality of compressor assemblies of the natural-gas compression station in an improved or optimum way, by regulating the characteristic maps of the compressor assemblies, the characteristic maps of the compressor assemblies being permitted to have considerable differences from one another.

SUMMARY OF THE INVENTION

These and other objects are achieved, according to the invention, in that, after the start of a second or a further compressor assembly which are driven by gas turbines, the rotational speeds of the running compressor assemblies are run in a fixed rotational speed ratio with respect to characteristic-map data filed for each compressor assembly; thereafter this fixed rotational speed ratio is varied by means of an equal-percentage throughflow quantity adjustment via the rotational speed, until surge prevention valves of the natural-gas compression station are closed; thereafter the operating points of the compressor assemblies in their characteristic maps are lead as far as possible toward the maximum efficiency line; thereafter, in a continuous operating mode of the natural-gas compression station, optimum rotational-speed desired values are determined by a reciprocal mutually coordinated variation of the rotational-speed desired values of the compressor assemblies, the fuel consumption of the natural-gas compression station being taken into account; and, on the basis of optimum rotational-speed desired values thus determined, the stored fixed rotational speed ratio is adjusted and stored.

By the rotational-speed desired values of the various compressor assemblies being trimmed, an optimum position of the individual operating points in the various characteristic maps of the compressor assemblies, and therefore a minimum use of fuel for the compressor output demanded by the natural-gas compression station, are achieved. By virtue of the minimization of fuel consumption achieved in this way, the emission of the exhaust-gas quantity and therefore the emission of $NO_X$ and $CO_2$ are reduced.

The above-outlined sequence control for the purpose of minimizing the fuel consumption of the natural-gas compression station can advantageously be implemented on the basis of an automation program installed for operating the natural-gas compression station, so that there is no need for a separate optimization program or any other program module. In the method according to the invention, optimization, taking into account the minimization of the fuel consumption of the natural-gas compression station, is carried out by means of mutually coordinated characteristic-curve displacements of the individual compressor assemblies.

In an advantageous embodiment of the method according to the invention, the rotational-speed desired values for the individual compressor assemblies are transmitted by a station controller of the natural-gas compression station to individual rotational-speed controllers of the individual compressor assemblies, the controlled variable used for the station controller being that controlled variable of a plurality of controlled variables which has the lowest positive control deviation.

The station throughflow, or throughflow quantity, the suction pressure, the final pressure or the final temperature of the natural-gas compression station may function as controlled variables.

The trimming or the mutually coordinated variation of the rotational-speed desired values of the individual compressor assemblies of the natural-gas compression station, taking into account the minimization of the fuel consumption of the entire natural-gas compression station, can advantageously be implemented by means of an optimization computer arranged between the station controller and the individual rotational-speed controllers of the individual compressor assemblies.

BRIEF DESCRIPTION OF THE DRAWINGS

The invention is explained in more detail below with reference to an embodiment, FIG. 1 showing compressor characteristic maps of compressor assemblies, FIG. 2 showing an operating and observation surface of a PC monitor used for controlling a compressor station, FIG. 3 showing a movement of an operating point in a base load compressor characteristic map of a compressor assembly in the related art, and FIG. 4 showing a movement of an operating point in a peak load compressor characteristic map of a compressor assembly in the related art.

DETAILED DESCRIPTION OF THE PREFERRED EMBODIMENTS

Figure 3:
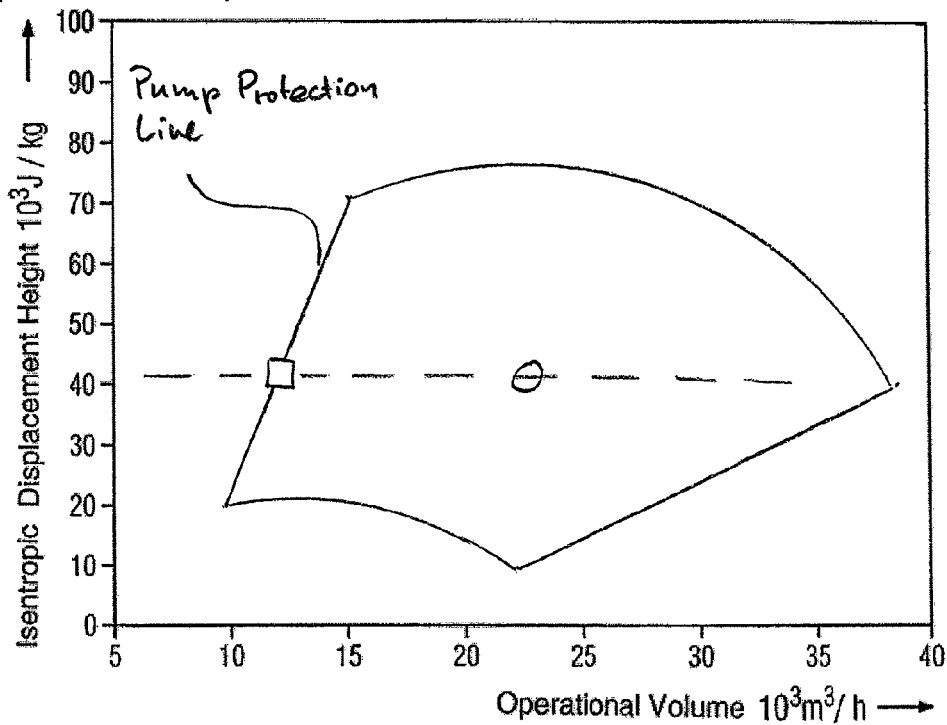
Figure 4:
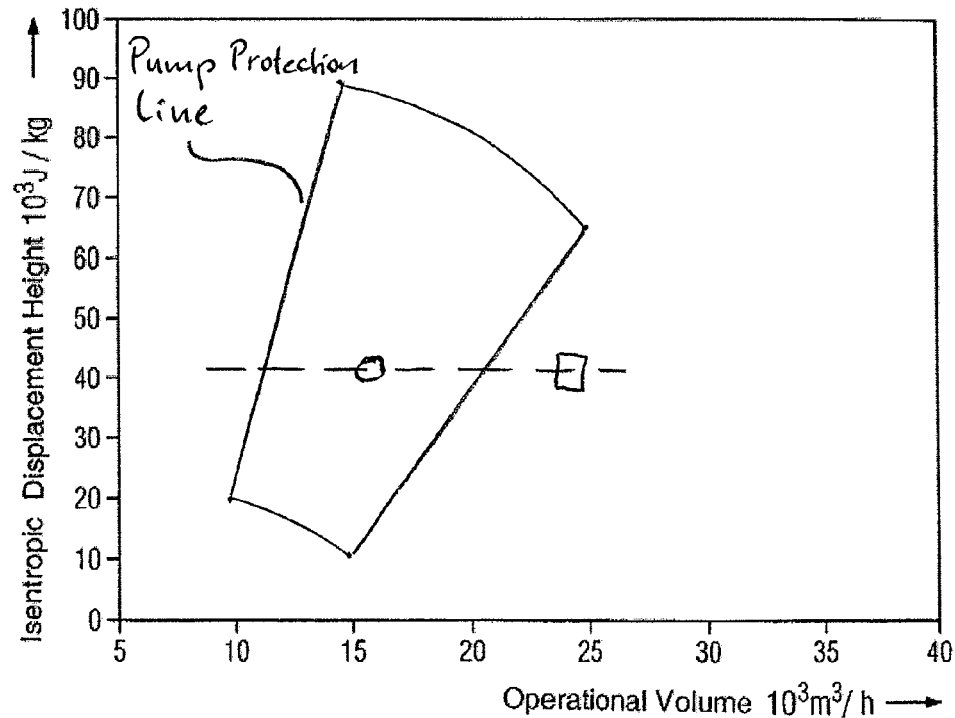

A natural-gas compression station has a multiplicity of individual compressor assemblies which have at least partially different drive machines and different rotors. This is attributable, for example, to the fact that some compressor assemblies are provided for covering basic-load operation and other compressor assemblies are provided for covering peak-load operation. An example of a characteristic map of a compressor assembly in the related art for covering basic-load operation is shown in FIG. 3. FIG. 4 shows an example of a characteristic map of a compressor assembly in the related art provided for covering peak-load operation. Four operating points are shown, a first operating point located on the pump protection line in FIG. 3 and a second operating point located to the right of the characteristic map in FIG. 4. The points represent operating points of two related art compressor assemblies that start operating at the same rotational speed. The two operating points move to the respective operating points after optimization within the characteristic maps when the operation of both related art compressor assemblies is optimized.

In an exemplary embodiment of the present invention, in order to optimize the operation of a plurality of compressor assemblies of a natural-gas compression station, after the successful start of a further or additional compressor assembly of the natural-gas compression station, a station controller of the natural-gas compression station will run the rotational speeds of the now operative compressor assemblies of the natural-gas compression station in a fixed rotational speed ratio to the characteristic-map data filed for each compressor assembly.

This fixed rotational-speed ratio is subsequently varied by means of an equal-percentage throughflow quantity adjustment via the rotational speed of the individual compressor assemblies, until surge prevention valves present in the natural-gas compression station are closed. Due to the closing of the surge prevention valves, a first fuel reduction takes place during the operation of the natural-gas compression station. What is achieved at the same time by the closing of the surge prevention valves is that the transport gas to be compressed or transported by means of the natural-gas compression station is heated to a lesser extent, with the result that, in turn, the energy balance at the natural-gas compression station has a more favorable configuration.

Figure 2A:
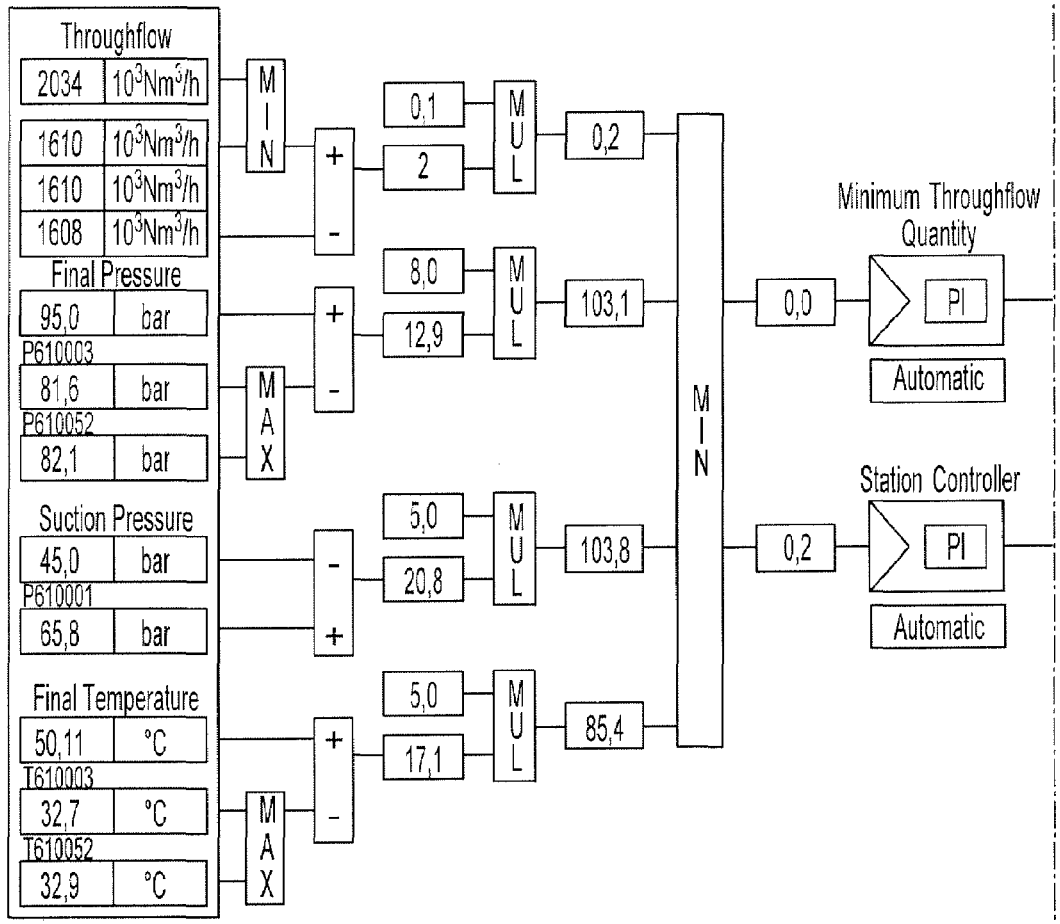
Figure 2B:
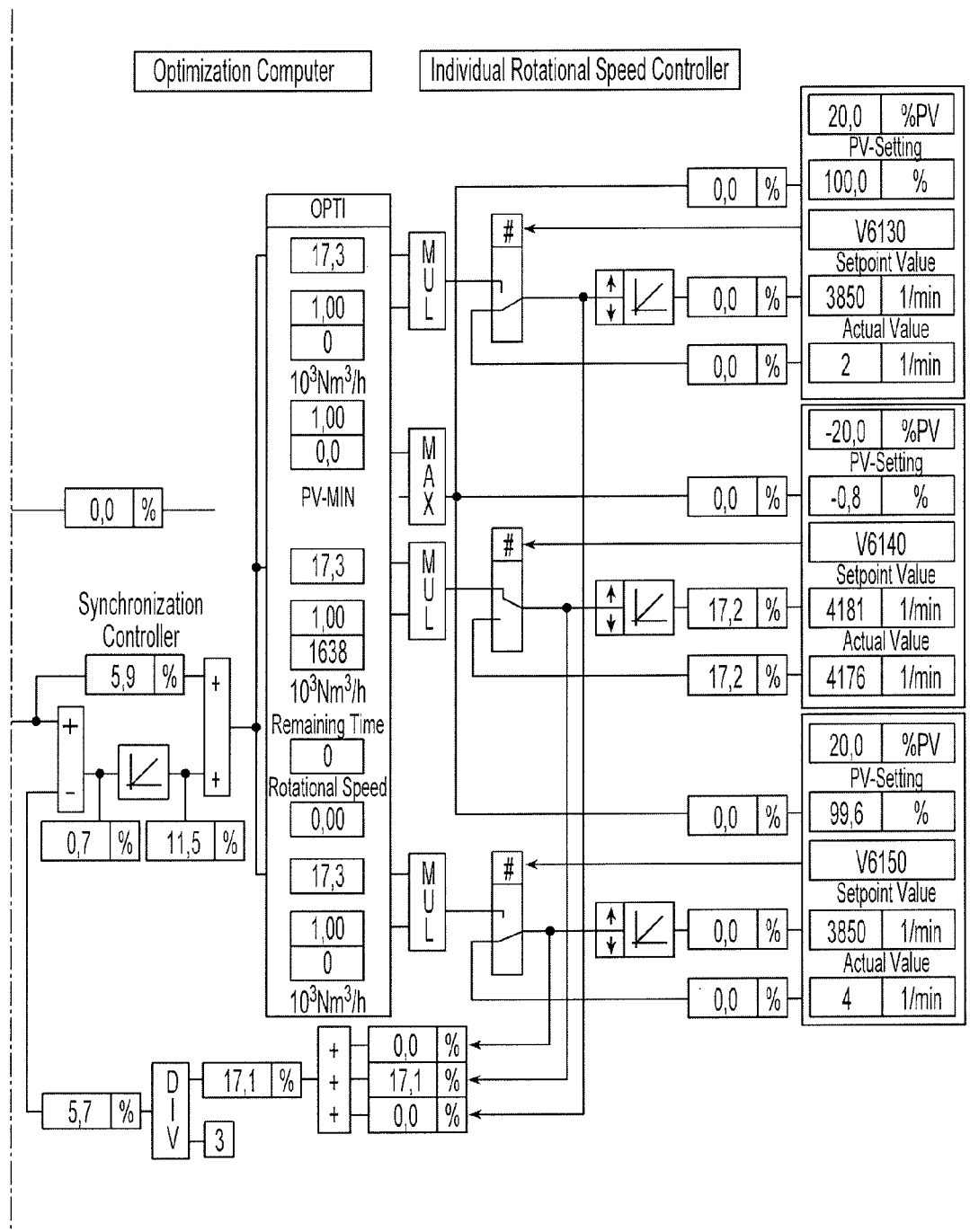

FIG. 2 is divided in FIG. 2A and FIG. 2B and shows an operating and observation surface of a PC monitor used for controlling a compressor station. In FIG. 2A, the controlled variables throughflow, final pressure, suction pressure, and final temperature are linked with one another and controlled by the station automation (not shown), whereby the minimum throughflow quantity is considered as one parameter. FIG. 2A also shows the functions of the station controller.

When all the surge prevention valves of a natural-gas compression station are closed, the operating points of the individual compressor assemblies in their characteristic maps are lead toward their maximum efficiency line, in so far as this is possible.

Figure 1:
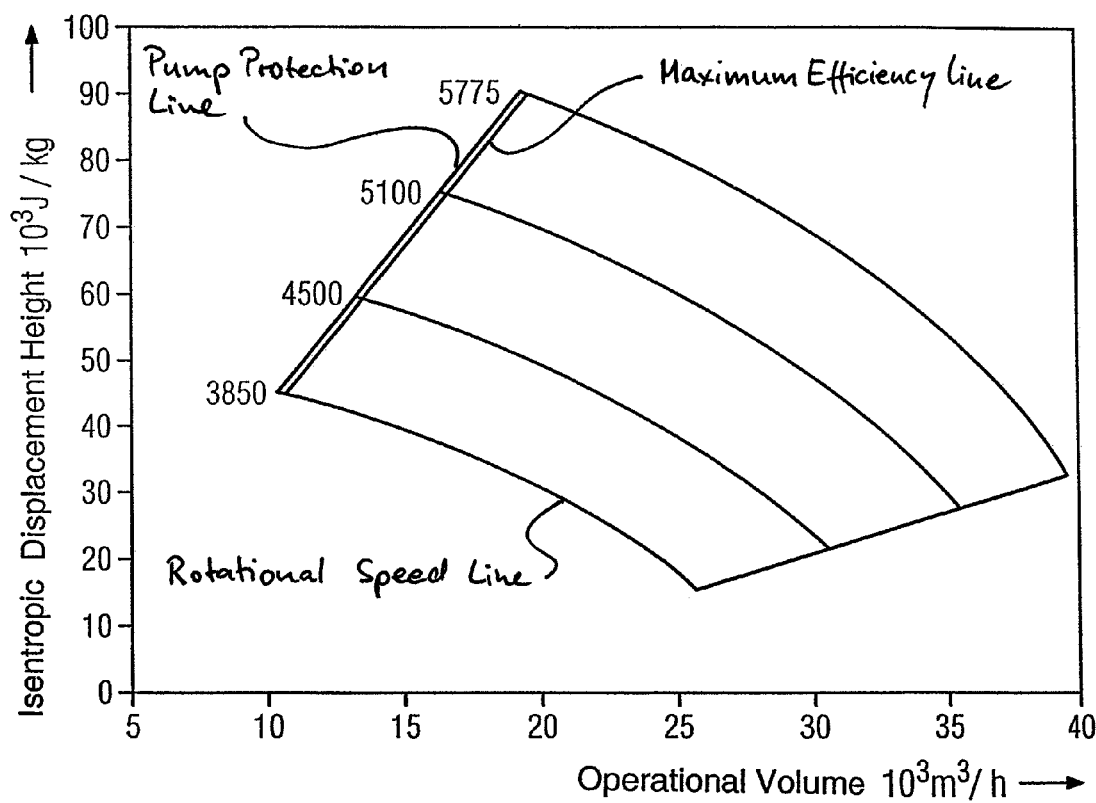

An example of a characteristic map is shown in FIG. 1. The isentropic displacement height is plotted versus the operational volume in a rectangular array. The characteristic map of the compressor assembly displays the relationship of the operational volume, i.e., the flow through the compressor assembly (in cubic meters per hour) versus the displacement height, i.e., the pressure (in joules per kilogram) at various rotational speeds. The respective operating point is located inside the characteristic map. Certain lines are defined, such as pump protection line, maximum efficiency line and rotational speed lines.

During the subsequent continuous operating mode of the natural-gas compression station, optimum values for the rotational-speed desired values of the individual compressor assemblies are then searched for by means of a reciprocal trimming or mutually coordinated variation of the rotational-speed desired values of the individual compressor assemblies and the observation of the overall fuel consumption of the natural-gas compression station. After these optimum rotational-speed desired values are determined for the individual compressor assemblies, the abovementioned fixed rotational speed ratio with respect to the fixed characteristic-map data is adjusted according to the optimum rotational-speed desired values determined and is then stored.

The controlled variable having the lowest positive control deviation functions as the controlled variable for the station controller of the natural-gas compression station. The rotational-speed desired value for the individual compressor assemblies is made available on the output side of the station controller. The transfer of these rotational-speed desired values made available on the output side of the station controller to the individual compressor assemblies is carried out by rotational-speed controllers which are assigned to the individual control units of the individual compressor assemblies.

In order to take into account the different design of the individual compressor assemblies, the rotational-speed desired values, before being transmitted to the rotational-speed controllers of the individual compressor assemblies, are trimmed by an optimization computer connected between the station controller and these individual rotational-speed controllers.

In FIG. 2B the optimization computer and the individual rotational-speed controllers are shown with the values that can be set. The particular values in the FIGS. 2A and 2B as well as the characteristic map are in principle well-known to one of ordinary skill in the field of control of turbo machines.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for optimizing the operation of a plurality of compressor assemblies of a natural-gas compression station, comprising:

after start of at least a second compressor assembly, running the rotational speeds of the running compressor assemblies in a fixed rotational speed ratio with respect to characteristic-map data for each compressor assembly, thereafter varying the rotational speed ratio by means of an equal-percentage adjustment of an operational volume of each of the running compressor assemblies and thereby adjusting the throughflow quantity of the natural-gas compression station via the rotational speed, until surge prevention valves of each of the running compressor assemblies of the natural-gas compression station are closed, thereafter leading the operating points of the compressor assemblies in their characteristic maps toward the maximum efficiency line by varying the rotational speeds of the running compressor assemblies, thereafter, in a continuous operating mode of the natural-gas compression station, determining rotational-speed desired values by means of a reciprocal mutually coordinated variation of the rotational-speed values of the compressor assemblies, in which the compressor station has a minimal fuel consumption of the natural-gas compression station and a minimal emission of an exhaust-gas quantity, and, on the basis of the rotational-speed desired values determined, adjusting and storing the fixed rotational speed ratio.

2. The method as claimed in claim 1, wherein the operating points of the compressor assemblies in their characteristic maps are led as far as possible toward the maximum efficiency line.

3. The method as claimed in claim 1, wherein sequence control is implemented utilizing an automation program for operating the natural-gas compression station.

4. The method as claimed in claim 1, further comprising transmitting the rotational-speed desired values for the compressor assemblies by a station controller to rotational-speed controllers of the compressor assemblies, wherein the controlled variable used for the station controller is that controlled variable of a plurality of controlled variables that has the lowest positive control deviation.

5. The method as claimed in claim 1, in which at least one of throughflow quantity, suction pressure, final pressure, and final temperature for a natural-gas compression station function as controlled variables for the method.

6. The method as clamed in claim 3, wherein the mutually coordinated variation of the rotational-speed desired values of the compressor assemblies of the natural-gas compression station is carried out by means of an optimization computer arranged between the station controller and the rotational-speed controllers of the compressor assemblies.

* * * * *